（12）United States Patent
Kim et al.

(10) Patent No.: US 10,074,347 B2
(45) Date of Patent: Sep. 11, 2018

(54) DISPLAY AND METHOD FOR PROCESSING CURVED IMAGE THEREOF

(71) Applicant: LG DISPLAY CO., LTD., Seoul (KR)

(72) Inventors: Hyuck-Jun Kim, Goyang-si (KR); Sang-Ho Yu, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 197 days.

(21) Appl. No.: 14/850,640

(22) Filed: Sep. 10, 2015

(65) Prior Publication Data
US 2016/0078592 A1    Mar. 17, 2016

(30) Foreign Application Priority Data

Sep. 11, 2014 (KR) .......... 10-2014-0119976

(51) Int. Cl.
| | |
|---|---|
| G09G 5/00 | (2006.01) |
| G09G 5/395 | (2006.01) |
| G06F 3/01 | (2006.01) |
| G09G 5/37 | (2006.01) |
| G09G 5/36 | (2006.01) |
| G06T 3/00 | (2006.01) |

(52) U.S. Cl.
CPC .......... *G09G 5/395* (2013.01); *G06F 3/013* (2013.01); *G06T 3/005* (2013.01); *G09G 5/363* (2013.01); *G09G 5/37* (2013.01); *G09G 2320/068* (2013.01); *G09G 2380/02* (2013.01)

(58) Field of Classification Search
None
See application file for complete search history.

(56) References Cited

U.S. PATENT DOCUMENTS

| | | | | |
|---|---|---|---|---|
| 2010/0201783 | A1* | 8/2010 | Ueda .................. | G02B 27/2228 348/46 |
| 2011/0242339 | A1* | 10/2011 | Ogawa ............... | H04N 5/23254 348/208.4 |
| 2012/0235893 | A1 | 9/2012 | Phillips et al. | |
| 2014/0111417 | A1* | 4/2014 | Son .......................... | G06F 3/14 345/156 |
| 2015/0192992 | A1* | 7/2015 | Di Censo ............... | G02B 27/01 345/156 |
| 2016/0054796 | A1* | 2/2016 | Cho ..................... | G06K 9/0061 345/156 |

FOREIGN PATENT DOCUMENTS

| | | |
|---|---|---|
| CN | 102723058 A | 10/2012 |
| CN | 103247235 A | 8/2013 |
| CN | 103713436 A | 4/2014 |
| CN | 103730062 A | 4/2014 |
| CN | 103871347 A | 6/2014 |

\* cited by examiner

*Primary Examiner* — Frank Chen
(74) *Attorney, Agent, or Firm* — Birch, Stewart, Kolasch & Birch, LLP

(57) ABSTRACT

A curved display and a method for processing an image thereof are discussed. The curved display according to an embodiment includes a display panel selectively including a flat surface and a curved surface, and a controller including a signal processor for receiving image signal information from an external system, converting the image signal information into an image signal appropriate for the display panel, and distributing the image signal to the display panel, and a curved image generator for receiving the image signal and generating a curved image signal varied to correspond to a viewer's horopter surface corresponding to a curved surface when the display panel is a curved surface.

14 Claims, 9 Drawing Sheets

Curved image

Flat image

Curved image

FIG. 6
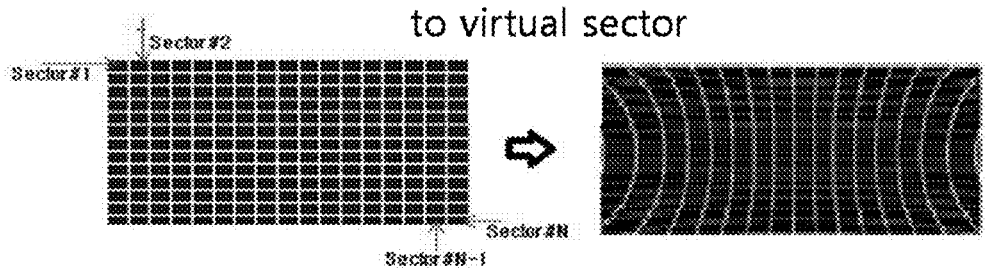
FIG. 7
Supply curved image signal corresponding to virtual sector
FIG. 8A
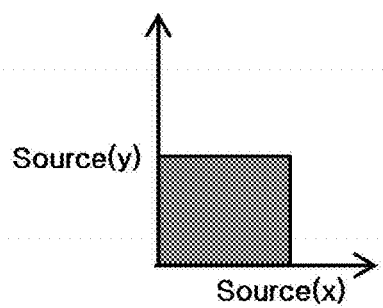

$$f\begin{pmatrix}x\\y\end{pmatrix} = \begin{pmatrix}k & 0\\0 & k'\end{pmatrix} source\begin{pmatrix}x\\y\end{pmatrix} = \begin{pmatrix}a\\b\end{pmatrix}$$

$$dest\begin{pmatrix}x\\y\end{pmatrix} = \begin{pmatrix}cos\Phi & sin\Phi\\-sin\Phi & cos\Phi\end{pmatrix}\begin{pmatrix}a\\b\end{pmatrix} = \begin{pmatrix}a'\\b'\end{pmatrix}$$

though the screen is enlarged, the recognized image
DISPLAY AND METHOD FOR PROCESSING CURVED IMAGE THEREOF This application claims the priority benefit of Korean Patent Application No. 10-2014-0119976, filed on Sep. 11, 2014, which is hereby incorporated by reference as if fully set forth herein.

BACKGROUND OF THE INVENTION

Field of the Invention

The present invention relates to a display, and more particularly, to a display and a method for processing a curved image thereof, for enhancing attraction power.

Discussion of the Related Art

Recently, a lightweight but large scale display device has been developed and has satisfied user requirements. In particular, a flat and wide-angle display has been developed and thus can display a high quality image compared with a conventional display device.

FIG. 1 is a diagram illustrating a general flat display 10 and a processed image thereof according to a related art.

As shown in FIG. 1, the general flat display 10 displays a two-dimensional (2D) flat image on a flat surface.

The general flat display 10 receives R, G, and B images from an external system, image-processes the images by an internal controller, converts the images into an image signal appropriate for a display panel, supplies the image signal for separated sectors of a display on a 2D matrix according to timing of a gate driver and a source driver, and displays an image on a display surface.

However, in this case, since an eye as an organ through which a viewer detects an actual image has a spherical surface, when the viewer views an image, a gap between a display surface of a display and a horopter surface at which an equivalent distance is recognized toward both right and left sides from a front of a screen is gradually increased. Thus even if the screen is enlarged, the recognized image lacks realism.

SUMMARY OF THE INVENTION

Accordingly, the present invention is directed to a display and a method for processing a curved image thereof that substantially obviates one or more problems due to limitations and disadvantages of the related art.

An object of the present invention is to provide a display and a method for processing a curved image thereof, for enhancing attraction power (e.g., for providing an improved image that draws a viewer to focus on the image more).

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a curved display includes a display panel selectively including a flat surface and a curved surface, and a controller including a signal processor for receiving image signal information from an external system, converting the image signal information into an image signal appropriate for the display panel, and distributing the image signal to the display panel, and a curved image generator for receiving the image signal and generating a curved image signal varied to correspond to a viewer's horopter surface corresponding to a curved surface when the display panel is a curved surface.

The controller may further include an image signal input unit for receiving image signal information from the external system, a curvature determination unit for determining whether a display surface is a flat surface or a curved surface according to curvature of the display panel, a frame memory for storing the curved image signal in units of frames, and an image selection unit for distributing an image signal converted by the signal processor when the display surface is a flat surface according to determination of the curvature determination unit, and for distributing a curved image signal from the frame memory to the display panel when the display surface is a curved surface according to determination of the curvature determination unit.

The curved display may further include an eye tracking sensor for tracking movement of a viewer's eye at one edge of the display panel.

The movement of the viewer's eye tracked by the eye tracking sensor may be transmitted to the controller and may be used to define a viewer's horopter surface.

The curved image generator may receive the viewer's eye movement information from the eye tracking sensor.

The controller may further include a lookup table for storing parameter values for respective sectors on a matrix corresponding to curvature of the display panel, and the lookup table may transmit the parameter values for the respective sectors to the curved image generator.

The aforementioned curved display may also apply the curved image processing a flat display to supply an image signal varied to an image appropriate for a horopter surface of a viewer. In this case, the flat display may include a display panel including a display surface, and a controller including a signal processor for receiving image signal information from an external system, converting the image signal information into an image signal appropriate for the display panel, and distributing the image signal to the display panel, and a curved image generator for generating a curved image signal varied to correspond to a viewer's horopter surface.

In another aspect of the present invention, a method for processing an image of a display panel including a display panel having a variable display surface of a flat surface or a curved surface, includes receiving image signal information from an external system, converting the image signal information into an image signal appropriate for the display panel, determining whether a display surface is a flat surface or a curved surface according to curvature of the display panel, generating a curved image signal corresponding to a horopter surface of a viewer who views a display surface using the converted image signal when the display surface is a curved surface, storing the curved image signal in units of frames, and distributing the image signal corresponding to the display panel to the display panel when the display surface of the display panel is a flat surface according to determination of a curvature determination unit, and distributing a variable image signal to the display panel in units of frames when the display surface is a curved image.

The generating may include receiving a viewer's eye movement information from an eye tracking sensor disposed at one edge of the display pane and configuring a horopter surface according to an interval between curved surfaces of a display surface of the display such that a curved image corresponds to a point of the display surface, to which a convergence point of the horopter surface is projected.

The generating may include receiving parameter values for respective sectors from a lookup table for storing parameter values for respective sectors on a matrix appropriate for curvature of the display panel and varying image signals for the sectors.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 6 is a diagram illustrating a lookup table used to process an image of a curved display according to the first embodiment of the present invention;

FIG. 7 is a diagram illustrating an example of a method for generating a curved image in a method for processing an image of a curved display according to an exemplary embodiment of the present invention;

FIGS. 8A to 8C are diagrams illustrating a source signal, an amplitude conversion signal, and a destination signal corresponding to a variable sector, respectively according to an embodiment of the present invention;

DETAILED DESCRIPTION OF THE INVENTION

Reference will now be made in detail to the preferred embodiments of the present invention, examples of which are illustrated in the accompanying drawings.

Figure 2:
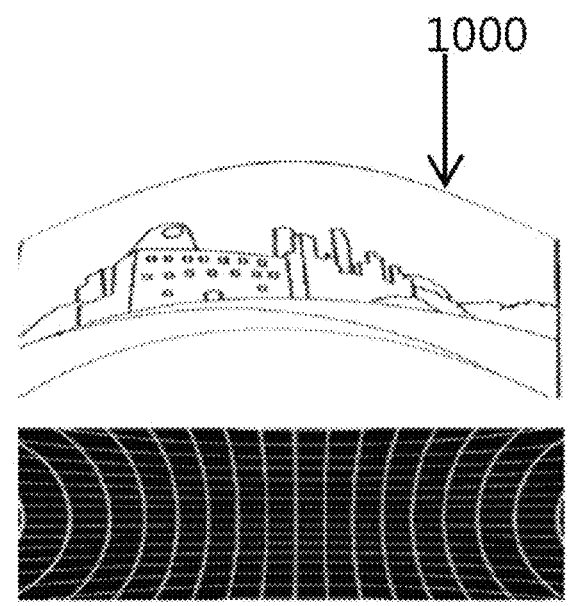
FIG. 2 is a diagram illustrating a curved display and a processed image to which curvature thereof is applied, according to an exemplary embodiment of the present invention.

FIG. 2 is a diagram illustrating a curved display 1000 and a processed image to which curvature thereof is applied, according to an exemplary embodiment of the present invention.

Figure 3A:
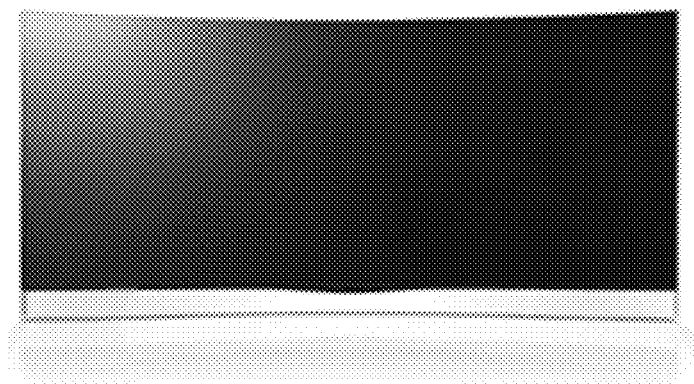
FIGS. 3A and 3B are front and side images of a curved display, respectively according to an embodiment of the present invention.
Figure 3B:
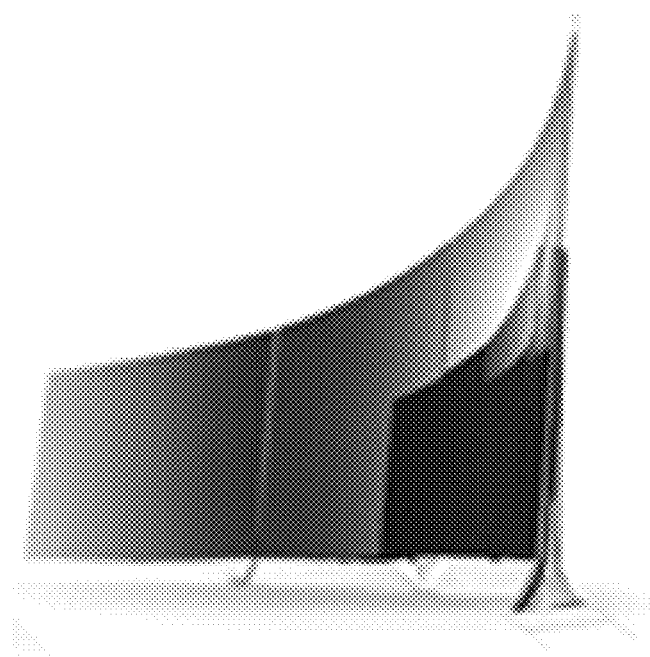

FIG. 2 illustrates the case in which a surface of a display panel that a viewer views is curved toward the viewer at right and left sides when a curved display 1000 according to the exemplary embodiment of the present invention is positioned in such way that the viewer views a central portion of a display panel, like in FIGS. 3A and 3B.

The curved display 1000 may include a display panel, a surface of which displays an image, and a controller for controlling an image of the display panel.

The controller is disposed at a rear surface of the display panel to be accommodated in a case.

In addition, the curved display 1000 may selectively have a flat shape and a curved shape. In this regard, the flat shape or the curved shape may be selected by a user, and for example, when a viewer selects a specific image through a remote controller, a signal of the remote controller may be received via an infrared method to change a state of the curved display 1000.

Figure 4:
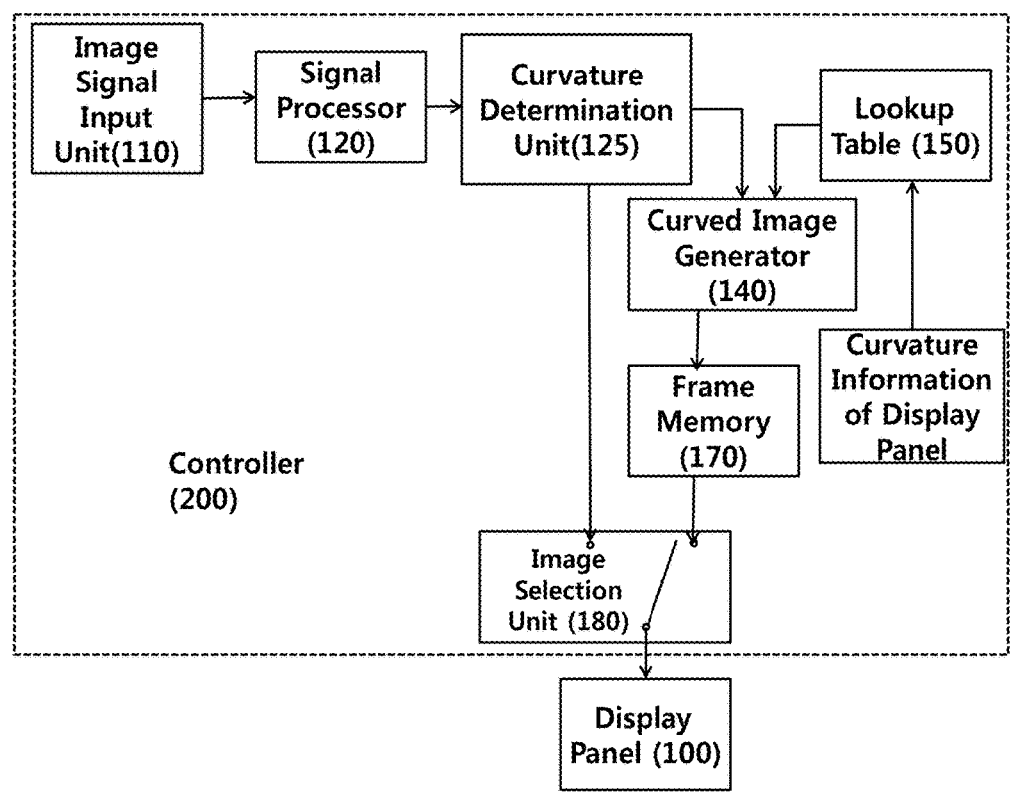
FIG. 4 is a block diagram of a controller of a curved display according to a first embodiment of the present invention.

The curved display 1000 according to the exemplary embodiment of the present invention includes a controller 200 for controlling image-processing (e.g., see FIG. 4), a signal processor 120 for receiving image signal information from an external system, converting the image signal information into an image signal appropriate for the display panel, and distributing the image signal to the display panel, and a curved image generator 140 for receiving the image signal and generating a curved image signal that is varied to be appropriate for a viewer's horopter surface corresponding to a curved image when the display panel is in a curved state like in FIG. 2. The elements 120 and 140 may be part of the controller 200 as shown in FIG. 4.

Figure 1:
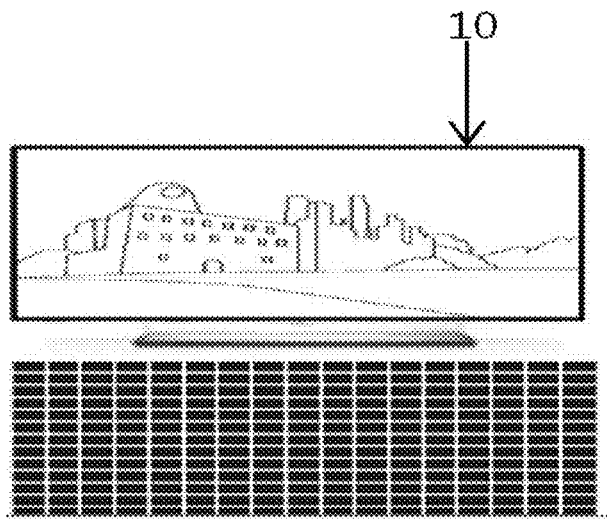
FIG. 1 is a diagram illustrating a general flat display and a processed image thereof according to a related art.

The curved display 1000 may have a gate line and a data line, which perpendicularly cross each other, as components of the display panel, apply a unit image signal to each sector defined between the gate line and the data line, and display an image. In this case, sectors may be arranged in matrix formation in which rows and columns perpendicularly cross each other according to arrangement of the gate line and the data line, like in FIG. 1. In addition, when a display panel is curved, a controller may receive image signal information from an external system, convert the image signal information into a flat image signal appropriate for the display panel, and distribute corresponding unit image signals to the respective sectors of the display panel.

When the display panel has a curved surface, the curved image generator 140 of the controller may re-generate a curved image signal according to virtual sectors defined by horizontal lines and vertical lines, which are originally perpendicularly cross each other on a flat surface and are considered or configured to be curved toward a center of the display panel of FIG. 2 on the configuration that a viewer's horopter surface contacts the curved surface according to curvature of the display panel, and distribute the curved image signal to the display panel. In reality, since each sector of the curved display 1000 is positioned on a perpendicular matrix, a compensation parameter may be applied according to a positional difference between virtual sectors and original sectors to supply a compensated image signal to each sector.

In addition, in a curved display according to an exemplary embodiment of the present invention, positions of eyes of the viewer may be tracked, an image corresponding to a flat surface, which is transmitted from an external system, may be image-processed by an internal controller so as to correspond to a horopter surface that a viewer feels with respect to an actual display surface, and a re-processed image to which curvature information is applied may be distributed on a matrix that is newly applied to curvature of the display surface, as illustrated in FIG. 2.

That is, the re-processed image appropriate for the curvature of the curved display may be displayed on the display surface. In this case, sectors from which image signals are emitted may be separated in such a way that rows and columns concentrate on central portion according to curvature rather than being distributed on a matrix including horizontal parallel rows and horizontal parallel columns like in a general display apparatus. That is, as illustrated in FIG. 2, vertical lines for distinguishing sectors may be almost vertical lines to divide an image into two right and left pieces with respect to a central portion of an image but may be bent toward the central portion at right and left edges, may not be parallel to each other, and may be shaped like a circular arc, a diameter of which is reduced away from the central portion to the left and right.

Horizontal lines for distinguishing sectors may also be bent toward the central portion of the image for the same reason, but a parallax that a viewer feels in a vertical direction is smaller than the vertical lines, and thus bending degrees of the horizontal lines for distinguishing sectors in a vertical direction are different between the central portion and both two upper and lower ends.

However, bending of each of vertical lines and horizontal lines, which distinguish virtual sectors, may be changed according to curvature of a curved display and the size of the curved display, and when the curvature of the curved display is variable, sectors on different matrices may be defined according the respective curvatures.

Hereinafter, a detailed structure of a controller of a curved display according to an exemplary embodiment of the present invention will be described.

FIG. 4 is a block diagram of the controller 200 of a curved display according to a first embodiment of the present invention.

As illustrated in FIG. 4, the controller 200 of the curved display according to the first embodiment of the present invention may include an image signal input unit 110 that receives image signal information from the external system, the signal processor 120 that receives the image signal information and performs predetermined signal-processing according to supply of the display panel, a curvature determination unit 125 for determining whether a display surface is a flat surface or a curved surface according to the curvature of the display, the curved image generator 140 for generating a curved image signal that is varied to correspond to a viewer's corresponding horopter surface on a curved surface when the display surface is a curved surface according to the determination of the curvature determination unit 125, a frame memory 170 for storing the curved image signal in units of frames, and an image selection unit 180 for distributing an image signal converted by the signal processor when the display surface is a flat surface according to the determination of the curvature determination unit and for distributing the curved image signal to the display panel 100 from the frame memory 170 when the display surface is a curved surface.

Here, in the controller 200 of the curved display according to the first embodiment of the present invention, the curved image generator 140 may be connected to a lookup table 150 for storing compensation parameter values for respective sectors according to a viewer recognition angle with respect to curvature. In addition, the lookup table 150 is connected to a curvature information unit 160 of the display panel 100, and thus when curvature of the display panel 100 is variable, the lookup table 150 may store compensation parameter values for respective sectors according to the number of variable cases and provide the corresponding compensation parameters to the curved image generator 140.

The image signal input unit 110 may receive image signal corresponding to a flat surface, and for example, may be a television broadcast receiver, an image reproduction device (player), a photographing device, or the like.

Here, the signal processor 120 may perform, for example, white balance adjustment, noise reduction processing, level compensation processing, gamma correction processing, and so on.

The curved image generator 140 may apply the compensation values for the respective sectors to the image signal of the signal processor 120 to generate an image signal according to curvature, and when a display surface is a curved surface by applying the image signal, a viewer may recognize an image having high attraction power and presence (e.g., a more realistic and attracting image is viewed).

In addition, the frame memory 170 for storing the image generated by the curved image generator 140 in units of frames may store image signals of a plurality of sectors for respective frames for a curved surface and then provide the image signals to a source driver (not shown) based on timing of a gate driver (not shown) according to selection of the image selection unit 180. The display panel 100 according to the exemplary embodiment of the present invention may include a gate driver and a source driver at an edge of the display panel 100 with respect to gate lines and data lines. The gate driver and the source driver may be physically installed in the display panel or may be attached to the display panel, but the display panel 100 according to the exemplary embodiment of the present invention may include the gate driver and the source driver that are any type of installation type and attachment type, and image signals output from the controller 200 may be provided to the source driver included in the display panel 100.

Hereinafter, a method for processing an image of a curved display according to the first embodiment of the present invention will be described with reference to FIG. 5.

Figure 5:
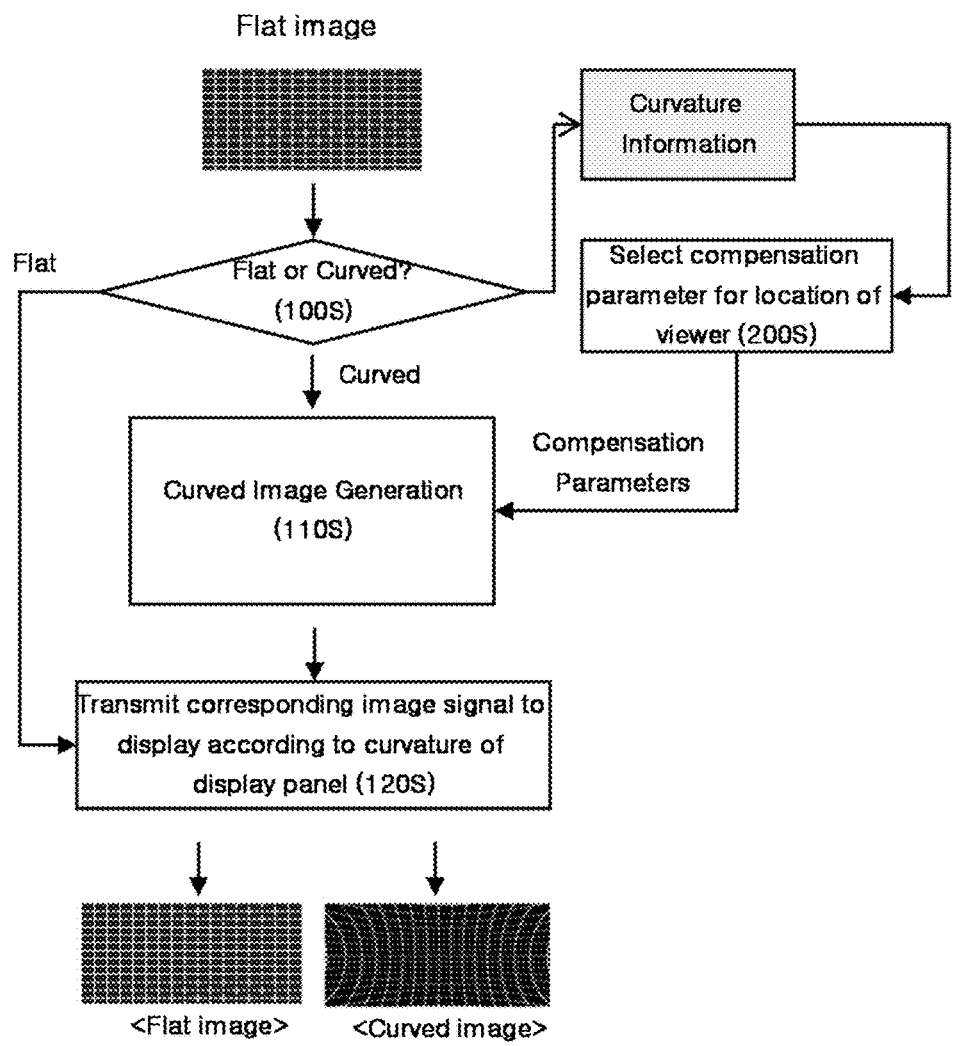
FIG. 5 is a flowchart illustrating a method for processing an image of a curved display according to the first embodiment of the present invention.

FIG. 5 is a flowchart illustrating a method for processing an image of a curved display according to the first embodiment of the present invention.

FIG. 5 illustrates, in particular, an operation of a curved image generator. First, the operation of the curved image generator may be performed by receiving an image signal obtained y receiving image signal information from an external system and processing the image signal information to correspond to the display panel by a controller.

Then, whether a display surface is a flat surface or a curved surface may be determined according to curvature of the display panel (100S).

Then, when the display surface is a curved surface, a curved image signal corresponding to a horopter surface of a viewer who views the display surface may be generated using the converted image signal (110S).

Then, after the curved image signal is stored in units of frames, an image selection unit may distribute an image signal corresponding to the display panel to the display panel when the display surface of the display panel is a flat surface according to determination of the curvature determination unit, and when the display surface is a curved surface according to determination of the curvature determination unit, the image selection unit may distribute a variable image signal to the display panel in units of frames (120S).

In the generating of the curved image signal (110S), a lookup table may be used to store parameter values for respective sectors on a matrix corresponding to curvature of the display panel, the parameter values for the respective sectors may be received from the lookup table according to the curvature, and image signals for the respective sectors may be varied to a curved image signal.

In addition, the curvature information may be transmitted to the lookup table from the curvature determination unit, and the lookup table may store compensation parameters for respective sectors of the display panel according to corresponding curvature via a test after introduction of the curved display panel (200S). A portion of a screen, which the viewer views, may be changed, and thus the compensation parameter values for the respective sectors may be different.

FIG. 6 is a diagram illustrating a lookup table used to process an image of a curved display according to the first embodiment of the present invention.

As illustrated in FIG. 6, a lookup table may store compensation parameters for respective sectors, which are stored via an experiment according to eye parallax information of a viewer with respect to a curved surface. Here, sectors of a horizontal axis may be divided into, for example, pixel units distinguished by a gate line and a data line, and A to Z of a vertical axis may be distance information between a surface of the display panel and the viewer.

That is, the lookup table may align and store compensation parameters of respective sectors for each distance from the viewer and use the compensation parameters as compensation values to generate a curved image.

Figure 8B:
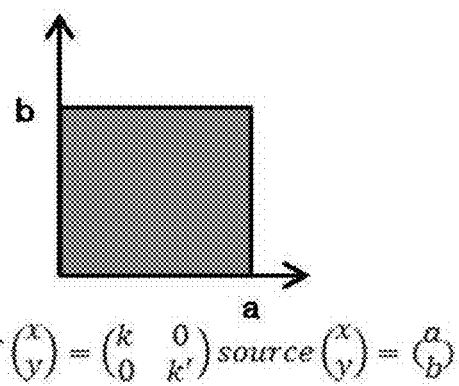
Figure 8C:
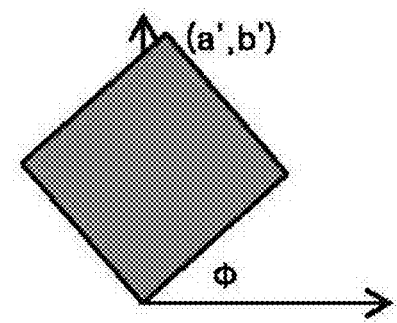

FIG. 7 is a diagram illustrating an example of a method for generating a curved image in a method for processing an image of a curved display according to an exemplary embodiment of the present invention. FIGS. 8A to 8C correspond to a source signal, an amplitude conversion signal, and a destination signal corresponding to a variable sector, respectively.

As shown in FIG. 7, sectors that perpendicularly cross each other and aligned on a matrix may vary an image signal into a curved image signal based on compensation parameters for the respective sectors according to eye parallax information of a viewer, and may apply a reduction, enlargement, or modification method during this process.

A source signal (x, y) of two-dimensional coordinates may be amplified to 'a' in a horizontal direction and 'b' in a vertical direction, as illustrated in FIG. 8B, and a last destination signal is re-distorted to correspond to a curved surface so as to correspond to a destination signal (a', b') such that a plurality of sectors that perpendicularly cross each other on actual input are modified to virtual curved sectors on a display.

The aforementioned method for generating a curved surface is just an example, and thus when empty sectors are generated due to a difference between an original sector and a virtual sector corresponding to a curved surface, the empty may be filled with image signals via an interpolation method.

Hereinafter, a curved display according to a second embodiment of the present invention will be described.

Figure 9:
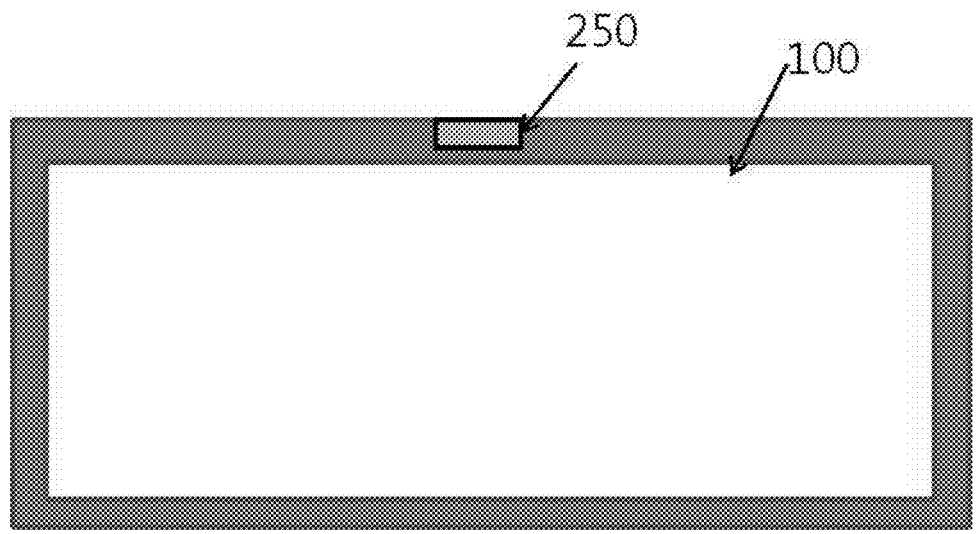
FIG. 9 is a plan view of a curved display according to a second embodiment of the present invention.
Figure 10:
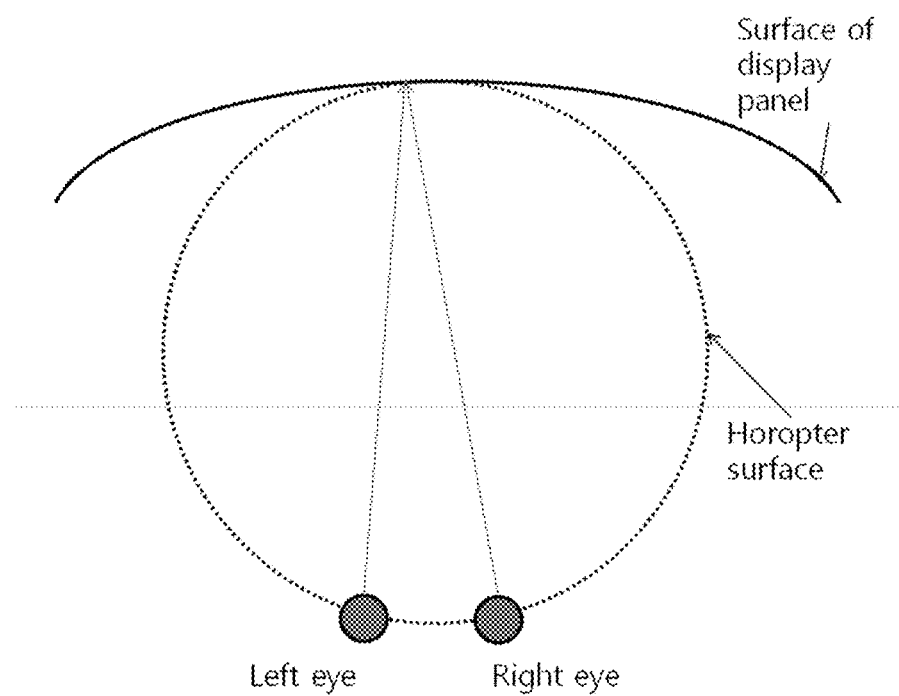
FIG. 10 is a diagram illustrating a horopter surface during image processing of the curved display according to the second embodiment of the present invention.

FIG. 9 is a plan view of a curved display according to a second embodiment of the present invention. FIG. 10 is a diagram illustrating a horopter surface during image processing of the curved display according to the second embodiment of the present invention.

As shown in FIG. 9, according to the second embodiment of the present invention, an eye tracking sensor 250 may be disposed at an edge of the display panel 100 instead of a lookup table included for each compensation parameter included in a controller, and FIG. 9 illustrates the case in which the eye tracking sensor 250 may directly receive motion of a viewer's eye, may set a horopter surface according to a recognition angle from a location of the viewer, and may supply a curved image signal so as to correspond to a point of a curved display surface, to which a convergence point is projected.

One or more eye tracking sensors 250 may be included.

A configuration of a controller of a curved display according to the second embodiment of the present invention will be described in detail with reference to FIG. 11.

Figure 11:
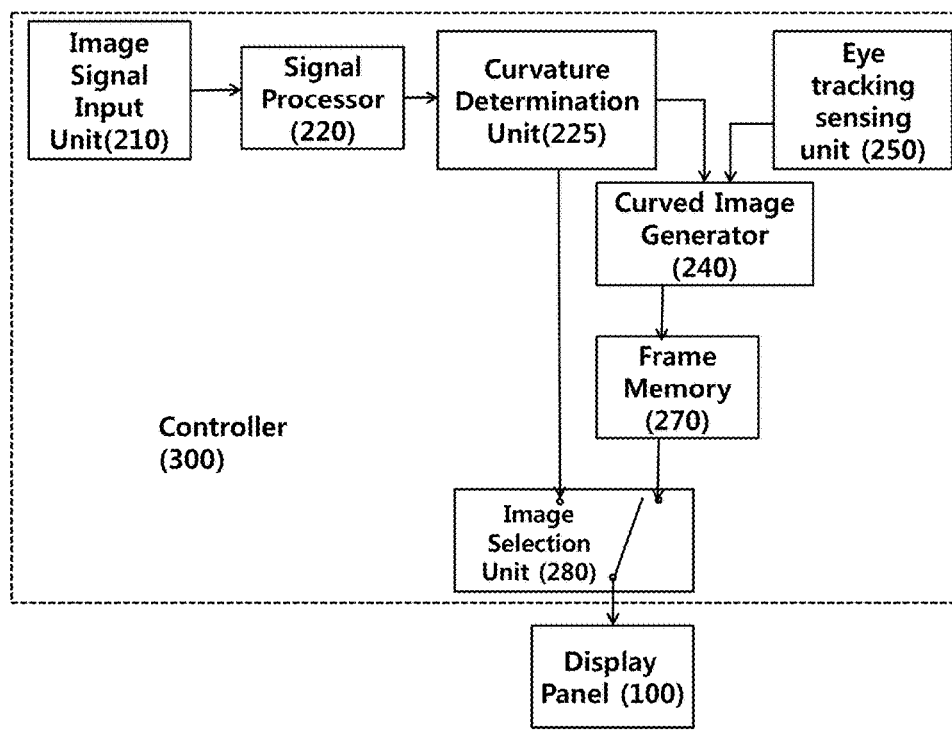
FIG. 11 is a block diagram of a controller of a curved display according to a second embodiment of the present invention.

As illustrated in FIG. 11, the controller 300 may include an image signal input unit 210 that receives image signal information from an external system, a signal processor 220 that receives the image signal information and performs predetermined signal processing according to supply of the display panel, a curvature determination unit 225 that determines whether a display surface of the display surface is a flat surface or a curved surface according to curvature of the display panel, a curved image generator 240 that generates a curved image signal varied to correspond to a viewer's corresponding horopter surface on a curved surface when the display surface is a curved surface according to determination of the curvature determination unit 225, an eye tracking sensing unit 250 that is positioned at an edge of the display panel 100, tracks a location of a viewer's eye, and transmits viewer eye spacing information from the display surface according to a viewer's recognition angle, a frame memory 270 that stores the curved surface signal in units of frames, and an image selection unit 280 that distributes the image signal converted by the signal processor to the display panel 100 when the display surface is a flat surface according to determination of the curvature determination unit, and distributes a curved image signal from the frame memory 270 to the display panel when the display surface is a curved surface according to determination of the curvature determination unit.

Here, the second embodiment is different from the first embodiment in that the eye tracking sensing unit 250 is configured instead of a lookup table, which is advantageous to also perform compensation processing on a curved image when a viewer is positioned to deviate from a predetermined viewer positional state.

The aforementioned curved image generator is disposed to distribute curved image signals corresponding to sectors with virtual curvature so as to correspond to a curved surface such that a curved display for displaying an image relatively widens a viewer's viewing angle, and an image may also be displayed by applying curvature information according to an spherical eye, thereby remarkably enhancing attraction power.

A recently developed curved display is bent toward a viewer by instrumentally applying curvature according to a viewer's recognition angle so as to reduce the viewer's inconvenience, but an image signal applied to the curved display still corresponds to a flat surface, and thus there is a difference from a flat image using the instrumental curved surface and the image signal to impede viewer's attraction power.

With regard to the curved display and the method for processing an image thereof according to an exemplary embodiment of the present invention, a controller for supplying an image signal to a display panel may include a curved image generator that includes a lookup table having a compensation parameter value that is formed as a database and stored in the controller or an eye tracking sensor that directly tracks a position of the viewer's eye, and thus a viewer's horopter surface that contacts a curved surface may be defined and a compensated curved image signal with respect to virtual sectors that correspond to or exceed the horopter surface and have a convergence point on a curved surface may be transmitted.

When the eye tracking sensor is used, even if a viewer changes his or her position outside a range determined in a lookup table, a curved image corresponding to the corresponding position may also be output, thereby enhancing attraction power at the corresponding location.

The curved image generator may be embodied by applying a compensation algorithm in the controller and may also be embodied without increase in the size of a device or a separate device.

Even if there is an instrumental limit of the curved display, a curved image closed to an ideal horopter surface may be supplied.

The aforementioned processing of a curved image may be applied to a flat display panel.

Figure 12:
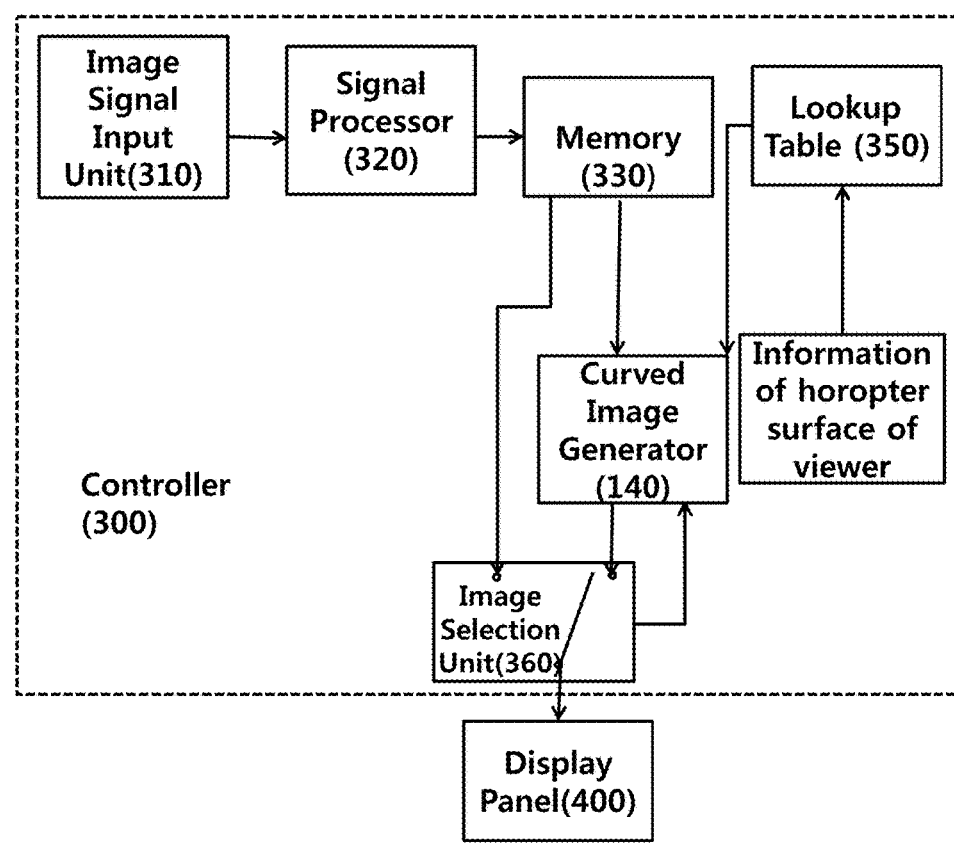
FIG. 12 is a block diagram illustrating a controller of a display according to a third embodiment of the present invention.

FIG. 12 is a block diagram illustrating a controller of a display according to a third embodiment of the present invention. Here, the display panel 100 is a flat panel.

As illustrated in FIG. 12, the controller 300 of the display according to the third embodiment of the present invention may include an image signal input unit 310 that receives image signal information from an external system, a signal processor 320 that receives the image signal information and performs predetermined signal-processing according to supply of a display panel 400, an image selection unit 360 for selecting of a flat image or a curved image according to selection of a viewer, a lookup table 350 having information about a horopter surface of the viewer, and a curved image generator 340 that is connected to the lookup table 350 and image selection unit 360 and generates a curved image signal that is varied to correspond to a viewer's horopter surface when the image selection unit 360 selects a curved surface.

Here, the signal processor 320 may primarily perform flat image processing appropriate for the display panel 400 and may be connected to the image selection unit 360 so as to supply a flat image to the display panel 400 without changes when the viewer selects the flat image.

In addition, a flat image is supplied to and stored in the signal processor 320 and a memory 330, the flat image stored in the memory 330 is output to the display panel 400 when the image selection unit 360 selects the flat image. In addition, the flat image stored in the memory 330 may be supplied to the curved image generator 340, processed according to viewer's horopter surface information transmitted to the lookup table 350, and converted into a curved image.

As such, the display according to the third embodiment of the present invention may re-process and set a flat image to a curved image according to the viewer's horopter surface according to the viewer selection, and thus a flat display panel may also display a stereoscopic image.

The curved display according to the exemplary embodiment of the present invention may be various panels with a flexible display panel. For example, when it is possible to slim and bend a substrate, the curved display may be embodied in various forms such as an organic light emitting display panel, a liquid crystal display panel, a quantum dot light emitting panel, and so on.

The aforementioned curved display and method for processing an image thereof according to exemplary embodiments of the present invention may have the following advantages.

With regard to the curved display and the method for processing an image thereof according to an exemplary embodiment of the present invention, a controller for supplying an image signal to a display panel may include a curved image generator that is operatively associated with a lookup table having a compensation parameter value that is formed as a database and stored in the controller or an eye tracking sensor that directly tracks a position of the viewer's eye, and thus a viewer's horopter surface that contacts a curved surface may be defined and a compensated curved image signal with respect to virtual sectors that correspond to or exceed the horopter surface and have a convergence point on a curved surface may be transmitted.

Accordingly, a viewer's attraction power may be enhanced using the recognition properties of the viewer.

When the eye tracking sensor is used, even if the viewer changes his or her position outside a range determined in a lookup table, a curved image corresponding to the corresponding position may also be output, thereby enhancing attraction power at the corresponding location.

The curved image generator may be embodied by applying a compensation algorithm in the controller and may also be embodied without increase in the size of a device or a separate device.

Even if there is an instrumental limit of the curved display, a curved image closed to an ideal horopter surface may be supplied such that the viewer watches an image with high attraction power, which is not affected by instrumental curvature.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A curved display comprising:
   a display panel selectively comprising a flat surface and a curved surface; and
   a controller comprising:
   a signal processor configured to receive image signal information from an external system, convert the image signal information into an image signal appropriate for the display panel, and distribute the image signal to the display panel; and
   a curved image generator configured to receive the image signal and generate a curved image signal varied to correspond to a viewer's horopter surface corresponding to the curved surface of the display panel,
   wherein the curved image signal is concentrated in a central portion of the curved surface of the display panel among the central portion and a peripheral portion, the central portion being shaped as a circular arc, and the peripheral portion including left, right, upper and lower portions of the display panel, and
   wherein the curved image signal is further compensated for positional differences between virtual sectors and original sectors in generating the curved image signal for the viewer's horopter surface based on the curved image signal being concentrated in the central portion of the curved surface of the display panel and not at the peripheral portion.

2. The curved display according to claim 1, wherein the controller further comprises:
an image signal input unit to receive the image signal information from the external system;
a curvature determination unit to determine whether a display surface is the flat surface or the curved surface according to curvature of the display panel;
a frame memory to store the curved image signal in units of frames; and
an image selection unit to distribute the image signal converted by the signal processor when the display surface is the flat surface according to a determination of the curvature determination unit, and to distribute the curved image signal from the frame memory to the display panel when the display surface is the curved surface according to the determination of the curvature determination unit.

3. The curved display according to claim 2, wherein:
the controller further comprises a lookup table for storing the parameter values for the respective sectors on a matrix corresponding to curvature of the display panel; and
wherein the parameter values for the respective sectors are transmitted from the lookup table to the curved image generator.

4. The curved display according to claim 2, further comprising an eye tracking sensor configured to track movement of the viewer's eye at one edge of the display panel.

5. The curved display according to claim 4, wherein the movement of the viewer's eye tracked by the eye tracking sensor is transmitted to the controller and is used to define the viewer's horopter surface.

6. The curved display according to claim 4, wherein the curved image generator receives the viewer's eye movement information from the eye tracking sensor.

7. The curved display according to claim 1, wherein a curved image of the curved image signal corresponds to a point of the curved surface, to which a convergence point of the horopter surface of the viewer's is projected.

8. A display comprising:
a display panel comprising a display surface; and
a controller comprising:
a signal processor configured to receive image signal information from an external system, convert the image signal information into an image signal appropriate for the display panel, and distribute the image signal to the display panel; and
a curved image generator configured to generate a curved image signal varied to correspond to a viewer's horopter surface based on a curved surface of the display panel,
wherein the curved surface of the display panel is closer to the viewer's horopter surface than a flat surface of the display panel,
wherein each of original sectors is defined as rectangular in the flat surface of the display panel, and
wherein at least one original sector of the original sectors is modified to a virtual curved sector having curved four sides in the curved surface of the display panel by a curvature of the curved surface of the display panel.

9. The display according to claim 8, wherein a curved image of the curved image signal corresponds to a point of the curved surface, to which a convergence point of the horopter surface of the viewer's is projected.

10. The display according to claim 8, wherein the curved surface of the display panel abuts the viewer's horopter surface.

11. A method for processing an image of a display comprising a display panel having a variable display surface of a flat surface or a curved surface, the method comprising:
receiving image signal information from an external system;
converting the image signal information into an image signal appropriate for the display panel;
determining whether a display surface of the display panel is the flat surface or the curved surface according to a curvature of the display panel;
generating a curved image signal corresponding to a horopter surface of a viewer who views the display surface based on the curved surface of the display panel;
storing the curved image signal in units of frames; and
distributing the image signal corresponding to the display panel to the display panel when the display surface of the display panel is the flat surface according to a determination of a curvature determination unit, and distributing a variable image signal to the display panel in the units of frames when the display surface is the curved surface,
wherein the curved surface of the display panel is closer to the horopter surface of the viewer than the flat surface of the display panel,
wherein each of original sectors is defined as rectangular in the flat surface of the display panel, and
wherein at least one original sector of the original sectors is modified to a virtual curved sector having curved four sides in the curved surface of the display panel by a curvature of the curved surface of the display panel.

12. The method according to claim 11, wherein the generating comprises receiving a viewer's eye movement information from an eye tracking sensor disposed at one edge of the display panel and configuring the horopter surface according to an interval between curved surfaces of the display surface of the display panel such that a curved image corresponds to a point of the display surface, to which a convergence point of the horopter surface is projected.

13. The method according to claim 11, wherein the generating comprises receiving the parameter values for respective sectors from a lookup table for storing the parameter values for the respective sectors on a matrix appropriate for the curvature of the display panel and varying image signals for the sectors.

14. The method according to claim 11, wherein the curved surface of the display panel abuts the horopter surface of the viewer.

* * * * *